United States Patent [19]
Rak et al.

[11] Patent Number: 5,636,776
[45] Date of Patent: Jun. 10, 1997

[54] VEHICLE ARTICLE CARRIER HAVING SLATS WITH CONCEALABLE CROSS BAR MOUNTING PORTIONS

[76] Inventors: Arthur K. Rak, 29018 Lund Dr., Warren, Mich. 48093; John S. Cucheran, 1069 Inca Trail, Lake Orion, Mich. 48035

[21] Appl. No.: 497,648

[22] Filed: Jun. 30, 1995

[51] Int. Cl.⁶ .................................................. B60R 9/00
[52] U.S. Cl. ........................ 224/322; 224/309; 224/325
[58] Field of Search ................................... 224/322, 323, 224/325, 326, 309, 316, 310, 315, 319

[56] References Cited

U.S. PATENT DOCUMENTS

| | | | |
|---|---|---|---|
| 4,174,794 | 11/1979 | Bott | 224/325 |
| 4,768,691 | 9/1988 | Stapleton | 224/325 |
| 5,377,890 | 1/1995 | Brunner et al. | |

*Primary Examiner*—David J. Walczak
*Attorney, Agent, or Firm*—Harness, Dickey & Pierce

[57] ABSTRACT

A vehicle article carrier having a pair of slats and a cross bar which is removably securable to the slats at mounting portions formed on each of the slats. Each mounting portion includes an associated cover member which may be quickly and easily positioned in the mounting portion when the cross bar is not attached to its respective slat to thereby cover the mounting portion and provide a more aesthetically pleasing appearance to each of the slats. Several alternative preferred embodiments of the cover member are disclosed with each enabling the mounting portion of the slat to be quickly and easily covered and uncovered without the need for special tools or extensive assembly/disassembly steps.

18 Claims, 5 Drawing Sheets

VEHICLE ARTICLE CARRIER HAVING SLATS WITH CONCEALABLE CROSS BAR MOUNTING PORTIONS

BACKGROUND OF THE INVENTION

1. Technical Field

This invention relates to vehicle article carriers, and more particularly to a vehicle article carrier having a pair of slats which each include at least one mounting portion to which the terminal ends of a cross bar are to be attached, and where a cover member is associated with each mounting portion to cover said mounting portion when said cross bar is detached from said slats.

2. Discussion

Vehicle article carriers are used in a wide-variety of applications to support and transport cargo atop an outer body surface such as a roof or a deck lid of a vehicle. Such vehicle article carriers typically include at least a pair of elongated slats which are fixedly secured to the outer body surface of the vehicle and a cross bar which is removably securable to the slats. To accomplish the removable attachment of the cross bar to the slats, each of the slats typically include some form of mounting portion or structure to which a terminal end portion of the cross bar can be releasably secured.

With vehicle article carriers such as described above, it is often desirable to remove the cross bar from the slats when the vehicle article carrier is not being used. Removing the cross bar can sometimes reduce the slight degree of aerodynamic drag and the slight degree of wind noise sometimes introduced by the cross bar. When the cross bar is removed, however, the mounting portions in each of the slats are exposed to the elements and become visually conspicuous, thus detracting somewhat from the aesthetically pleasing appearance and aerodynamic design of the slats.

Accordingly, it would be highly desirable to provide a pair of slats for a vehicle article carrier which include some form of cover member adapted to close-off the mounting portions of the slats when the cross bar is removed. Such a cover member would provide the advantage of helping to reduce the exposure of the mounting components mounted within each of the mounting portions of the slats from the elements, and further to provide each slat with a more aesthetically pleasing appearance when the cross bar is removed therefrom. It would also be highly desirable to provide some form of cover member for each of the slats which could be easily and quickly removed without the need for any special tools when a cross bar is to be attached to the slats, and to be repositioned within the mounting portions after the cross bar is again removed.

Accordingly, it is a principal object of the present invention to provide a vehicle article carrier having at least one slat, where the slat includes a cover member adapted to close-off a mounting portion of the slat where a terminal end portion of a cross bar would normally mount to the slat when a cross bar is not being used with the vehicle article carrier.

It is still a further object of the present invention to provide a vehicle article carrier having a slat which includes a cover member which can be quickly and easily moved into place to cover a mounting portion of the slat when a cross bar of the system is removed from the mounting portion in a manner that does not require the use of special tools, and which further can be accomplished in just moments by an individual.

It is still another object of the present invention to provide a vehicle article carrier having a slat which includes a mounting portion for allowing a cross bar to be secured to the slat, and which further includes a cover member adapted to cover the mounting portion when the cross bar is detached from the slat, and which further is shaped so as to conform to the profile of the slat to provide the appearance of an integrally formed component of the slat.

It is yet another object of the present invention to provide a vehicle article carrier having a slat having a mounting portion to which a cross bar is normally secured, and which includes a cover member which is inexpensive to manufacture and which may be used to quickly and easily cover the mounting portion of the slat when the cross bar is removed from the slat, and which further may be quickly and easily removable without the use of any special tools when the cross bar is to be reattached to the slat.

SUMMARY OF THE INVENTION

The above and other objects are provided by a vehicle article carrier in accordance with various preferred embodiments of the present invention. The vehicle article carrier generally includes at least one elongated slat which is fixedly secured to an outer body surface of a vehicle, and a cross bar which is releasably securable to the slat for supporting cargo thereon above the outer body surface. The slat includes a mounting portion to which a terminal end portion of the cross bar is releasably secured. A cover member is included which is operable to completely cover the mounting portion when the cross bar is removed from the slat. The cover member may be manually urged into the mounting portion of the slat without the use of any special tools and remains secured to the mounting portion until the user manually urges the cover member out of the mounting portion. When installed in the mounting portion, the cover member provides the appearance of an integrally formed component of the slat to provide a more aesthetically pleasing appearance to the slat. Functionally, the cover member serves the added benefit of helping to prevent water, snow and other elements from entering the mounting portion when the cross bar is detached from the slat.

In one preferred embodiment, the cover member includes a clip which is adapted to releasably maintain the cover member within the mounting portion of the slat. In an alternative preferred embodiment, the cover member includes a magnet and the slat includes a metallic securing bracket positioned within the mounting portion. The magnet and metallic securing bracket cooperate to assist in maintaining the cover member securely mounted within the mounting portion.

In still another alternative preferred embodiment of the present invention, the cover member includes structure which cooperates with the structure in the mounting portion to enable the cover member to be slidably inserted into the mounting portion and maintained therein via a tongue-in-groove arrangement.

In still another alternative preferred embodiment of the present invention, the slat includes a hollow portion adjacent the mounting portion and the cover member is slidably disposed within the hollow portion of the slat and moveable slidably between a retracted position and an extended position. In the retracted position, a majority of the cover member is concealed within the hollow portion of the slat, thus enabling the cross bar to be secured to the mounting portion without physically removing the cover member from the slat. In the extended position, the cover member functions to completely cover the mounting portion when the cross bar is not secured to the mounting portion.

Each of the preferred embodiments provides a means by which the mounting portion of the slat can be quickly and easily covered without the need for special tools or extensive disassembly and reassembly procedures. Each of the alternative preferred embodiments provide the added benefit of providing a more aesthetically pleasing appearance to the slat when the cross bar is not in use.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
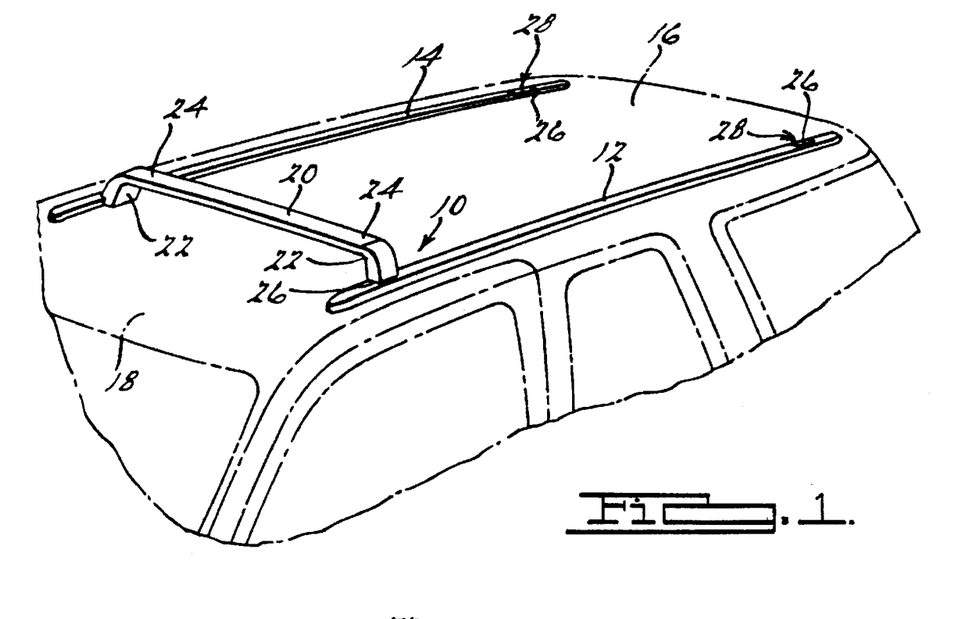
FIG. 1 is a perspective view of a portion of a vehicle (in phantom) showing a vehicle article carrier in accordance with a preferred embodiment of the present invention secured to an outer body surface of the vehicle.

Referring to FIG. 1, there is shown a vehicle article carrier 10 in accordance with a first preferred embodiment of the present invention. The vehicle article carrier 10 generally includes a pair of elongated slats 12 and 14 which are fixedly secured to an outer body surface 16 of a vehicle 18, and at least one cross bar 20 having a length sufficient to span the distance between the slats 12 and 14. The cross bar 20 has a bracket member 22 at each terminal end 24 thereof. Each bracket member 22 is adapted to releasably secure to a recess forming a mounting portion 26 of each slat 12 and 14. It will be appreciated immediately, however, that more than one cross bar 20 can be used with the vehicle article carrier 10, and that most commonly, a pair of cross bars 20 will be used to support cargo above the outer body surface 16.

In the drawing of FIG. 1, the vehicle article carrier 10 can be seen to comprise a pair of cover members 28 disposed within mounting portions 26 at the rearward ends of the slats 12 and 14. Without a second cross bar in position at the rearward ends of the slats 12 and 14, it can be seen how the cover members 28 form a means for covering the mounting portions 26 when a cross bar is not secured to the slat 12 and 14. The cover members 28 enerally conform to the cross-sectional profile of each of the slats 12 and 14 so as to provide the appearance of an integrally formed section of its associated slat 12 or 14 which does not detract from the aerodynamic styling of the slat 12 or 14 or its aesthetic appeal.

Figure 2:
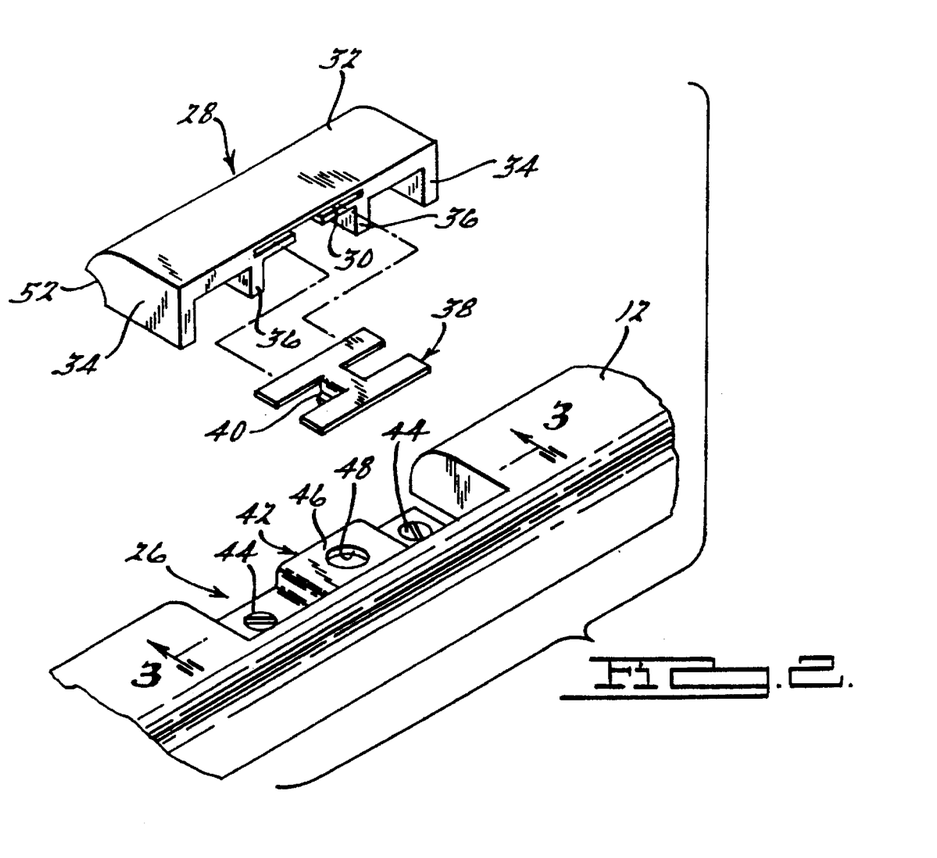
FIG. 2 is an exploded perspective view of a first preferred embodiment of the present invention.

With reference to FIG. 2, the construction of the cover member 28 and the slat 12 of the first preferred embodiment of the present invention can be seen more clearly. The cover member 28 includes a slot 30 formed within an upper surface portion 32. Integrally formed with the upper surface portion 32 are a pair of outer sidewalls 34 and inner wall members 36. Disposed within the slot 30 is a securing implement in the form of a clip 38, which is generally in the shape of an "H". The clip 38 includes a pair of tangs 40 (also visible clearly in FIG. 3), protruding perpendicularly therefrom.

Figure 3:
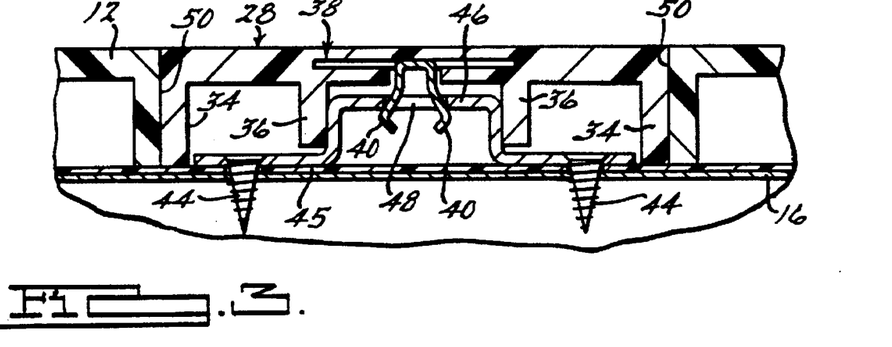
FIG. 3 is a partial cross-sectional view of the first preferred embodiment shown in FIG. 2 taken in accordance with section line 3—3 in FIG. 2.

With reference to FIGS. 2 and 3, the mounting portion 26 of the slat 12 includes a securing member 42 fixedly disposed such as by threaded screws 44 to a lower wall portion 45 (FIG. 3), and to the outer body surface 16 of the vehicle 18. In effect, the mounting portion 26 is formed by a large "notch" or cut-out section of a length just slightly larger than the length of the cover member 28. The securing member 42 is preferably formed from metal or another suitably strong material, and includes a raised central portions 46 having an aperture 48. When the cover member 28 is not secured in place in the mounting portion 26 of the slat 12, the aperture 48, which is preferably a threaded aperture, receives a threaded securing member (not shown) of the bracket member 22 of the cross bar 20 to enable the cross bar 20 to be threadably secured fixedly to the slat 12 and the outer body surface 16 of the vehicle 18.

When the cross bar 20 is not in use, the cover member 28 may be used to cover the mounting portion 26 by placing the cover member 28 above the slat 12 and pressing the cover member 28 downwardly into the mounting portion 26. As the cover member 28 is pushed downwardly into the mounting portion 26, the tangs 40 of the clip 38 engage within the aperture 48 as best seen in FIG. 3. The inner wall members 36 help to center the cover member 28 over the raised central portion 46, while the outer sidewalls 34 fit abuttingly against wall portions 50 of the mounting portion 26 of the slat 12.

To remove the cover member 28, a semi-circular recessed area 52 (FIG. 2) of the cover member 28 may be grasped with the edges of one or more fingers and lifted outwardly away from the outer body surface 16 of the vehicle 18. This causes the tangs 40 to be urged out of the aperture 48. Accordingly, no special tools are required to install or remove the cover member 28. Installation and removal is further accomplished quickly and easily without lengthy disassembly or assembly steps.

Figure 4:
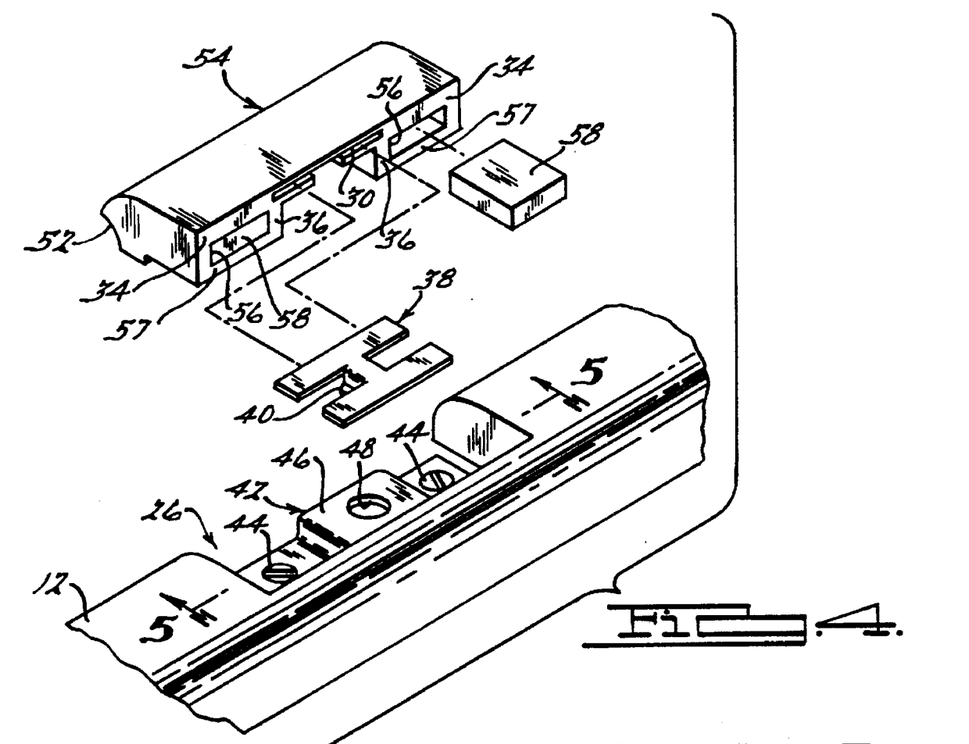
FIG. 4 is an exploded perspective view of a second alternative preferred embodiment of the present invention incorporating a magnet in the cover member and a metallic securing bracket disposed within the mounting portion of the slat.

Referring now to FIG. 4, a cover member 54 in accordance with a second alternative preferred embodiment of the present invention is shown. The cover member 54 is almost identical to the cover member 28 shown in FIG. 2, with the exception that a pair of recesses 56 are formed in between the outer sidewalls 34 and the inner wall members 36 by virtue of adding lower wall portions 57. In each of the recesses 56 is inserted a magnet 58. The H-shaped clip 38 is inserted within the slot 30 in identical fashion to that of the cover member 28.

Figure 5:
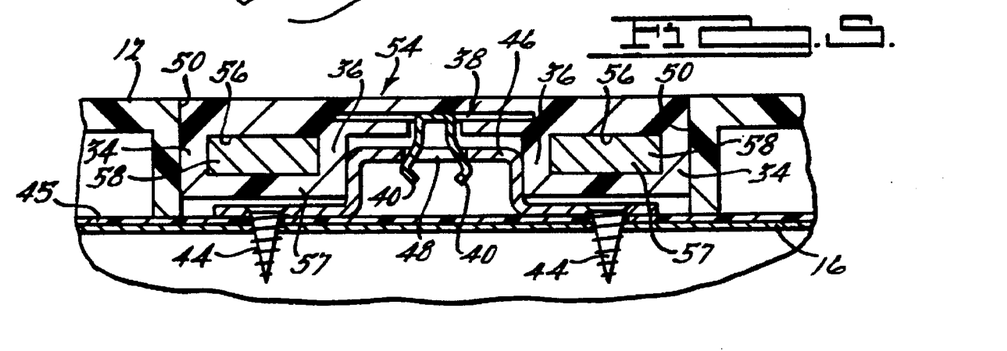
FIG. 5 is a cross-sectional view of the second alternative preferred embodiment shown in FIG. 4 taken in accordance with section line 5—5 in FIG. 4.

The securing member 42 comprises a metallic securing bracket which is magnetically attracted to the magnets 58 in the cover member 54 when the cover member 54 is inserted into the mounting portion 26 as described in connection with FIG. 2. Accordingly, in this embodiment, the tangs 40 of the clip 38 and the magnets 58 and securing member 42 work cooperatively to even further securely maintain the cover member 54 within the mounting portion 26 of the slat 12. It will be appreciated that the magnets 58 may be held within the recesses either by a slight degree of adhesive being placed in the recesses prior to insertion of the magnets 58 or, alternatively, by sizing the recesses 56 such that the magnets may be press-fit into the recesses 56 so that no adhesives are needed. Still further, the clip 38 could even be omitted from use if desired. With brief reference to FIG. 5, the attachment of the cover member 54 within the mounting portion 26 is shown.

Figure 6:
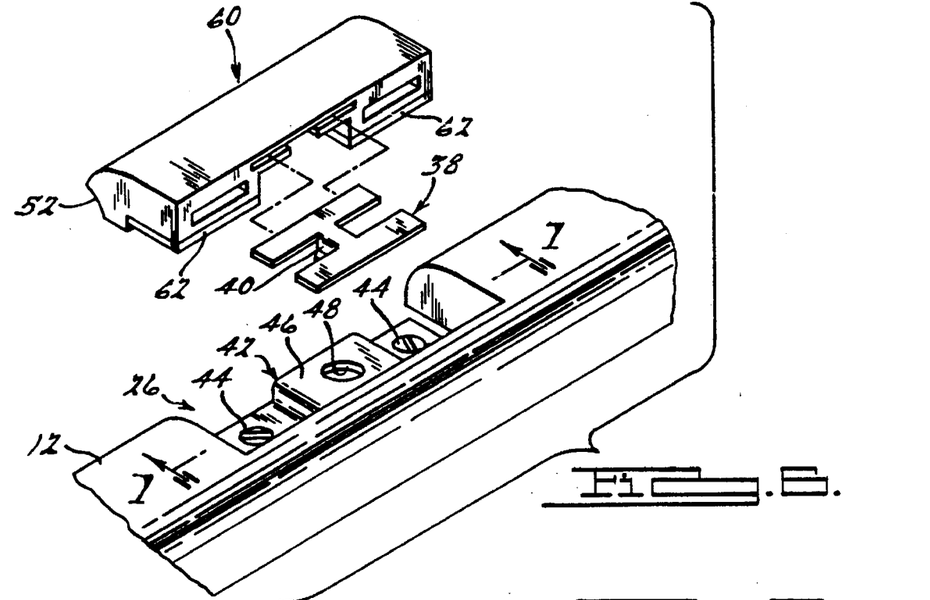
FIG. 6 is an exploded perspective view of a third alternative preferred embodiment of the present invention incorporating a pair of magnets affixed to an under surface of the cover member which cooperate with a metallic securing bracket positioned within the mounting portion of the slat.
Figure 7:
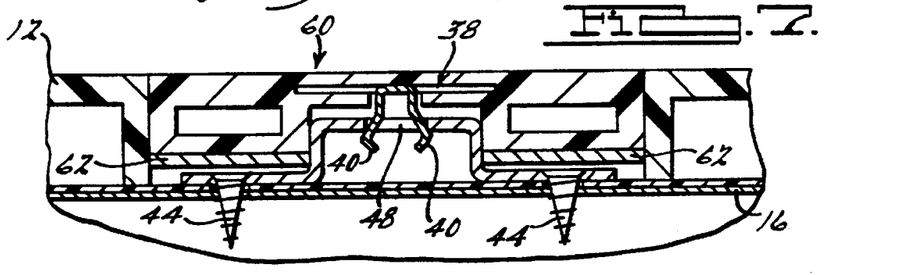
FIG. 7 is a partial cross-sectional view of the third alternative preferred embodiment shown in FIG. 6 taken in accordance with section line 7—7 in FIG. 6.

Referring now to FIG. 6, a cover member 60 in accordance with a third alternative preferred embodiment of the present invention is shown. The cover member 60 is similar to the cover member 54 with the exception that a pair of magnets 62 are secured to the lower wall portions 57 such as by adhesives. The cover member 60 includes the same H-shaped clip 38 having a pair of tangs 40 and the same securing member 42, which is also comprised of metal. From the drawing of FIG. 7, it can be seen how the magnets 62 are positioned even closer to the securing member 42 to provide an even stronger magnetic attraction of the cover member 60 to the securing member 42.

Figure 8:
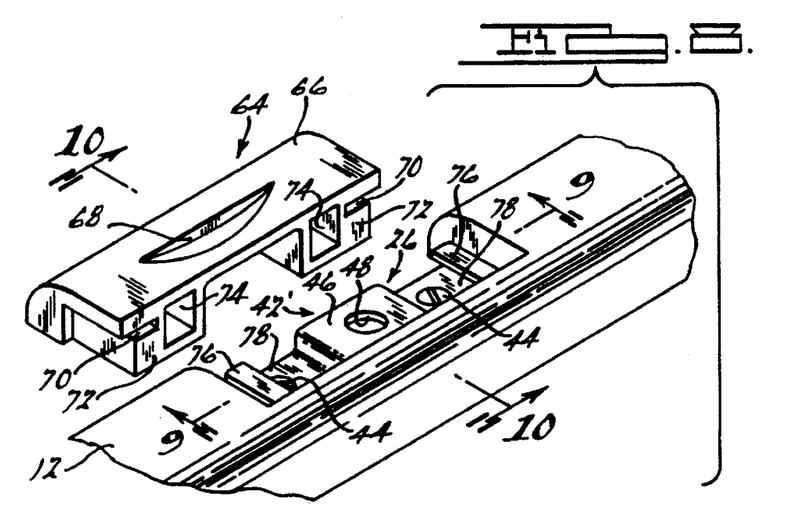
FIG. 8 is an exploded perspective view of a fourth alternative preferred embodiment of the present invention in which the cover member is slidably insertable into the mounting portion of the slat.

Referring now to FIG. 8, a cover member 64 in accordance with a fourth alternative preferred embodiment of the present invention is shown. The cover member 64 generally includes an outer surface 66 having a notch 68 formed therein, a pair of grooves or channels 70 formed in a pair of support portions 72 and opening outwardly away from one another, and an optional pair of recesses 74 formed in the support portions 72. The securing member 42' comprises a pair of ledge portions 76 extending inwardly towards each other at the ends of a pair of base portions 78 of the securing member 42'. The ledge portions 76 are positioned at a height above the base portions 78 such that they are in longitudinal alignment with the grooves 70 formed in the cover member 64.

Figures 9, 10:
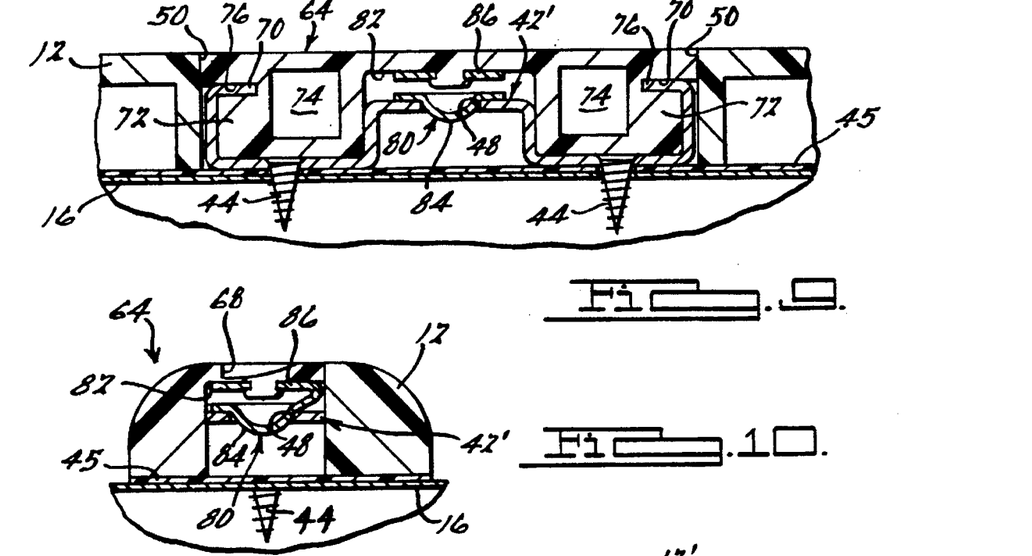
FIG. 9 is a partial cross-sectional view of the fourth alternative preferred embodiment shown in FIG. 8 taken in accordance with section line 9—9 in FIG. 8.
FIG. 10 is a partial cross-sectional view of the fourth alternative preferred embodiment shown in FIG. 8 taken in accordance with section line 10—10 in FIG. 8 when the cover member is slidably inserted into the mounting portion of the slat.

With brief reference to FIG. 10, the cover member 64 includes a clip 80 secured to an undersurface 82 of the cover member 64, preferably during molding of the cover member 64. The clip 80 has a semi-circular portion 84 depending from a mounting portion 86 of the clip 80.

With further brief reference to FIG. 8, when the cover member 64 is to be inserted into the mounting portion 26 of the slat 12, the cover member 64 is positioned laterally adjacent the slat 12 and slidably inserted perpendicularly toward the slat 12 into the mounting portion 26 of the slat 12 such that the ledge portions 76 of the securing member 42' engage within the grooves 70 in the cover member 64. As the cover member 64 is being inserted, the semi-circular portion 84 of the clip 80 also engages within the aperture 48 formed within the raised central portion 46 of the securing member 42'. Once fully slidably engaged within the mounting portion 26 of the slat 12, the cover member 64 cannot be lifted outwardly. To remove the cover member 64, one or more fingers are placed in the recessed portion 68 and the cover member 64 is pushed laterally outwardly of the mounting portion 26. During this process, the semi-circular portion 84 of the clip 80 is urged towards the mounting portion 86 of the clip 80 to allow the cover member 64 to be removed completely from the slat 12.

With further reference to FIGS. 8–10, it will be appreciated that the recesses 74 are not essential to operation of the cover member 64. However, if the recesses 74 are provided, then suitably shaped magnets (not shown) could be inserted therein. If the securing member 42' is formed of a metallic material, then the magnets disposed within the cover member 64 would provide an additional degree of holding strength to maintain the cover member 64 secured to the slat 12.

Figures 11, 12:
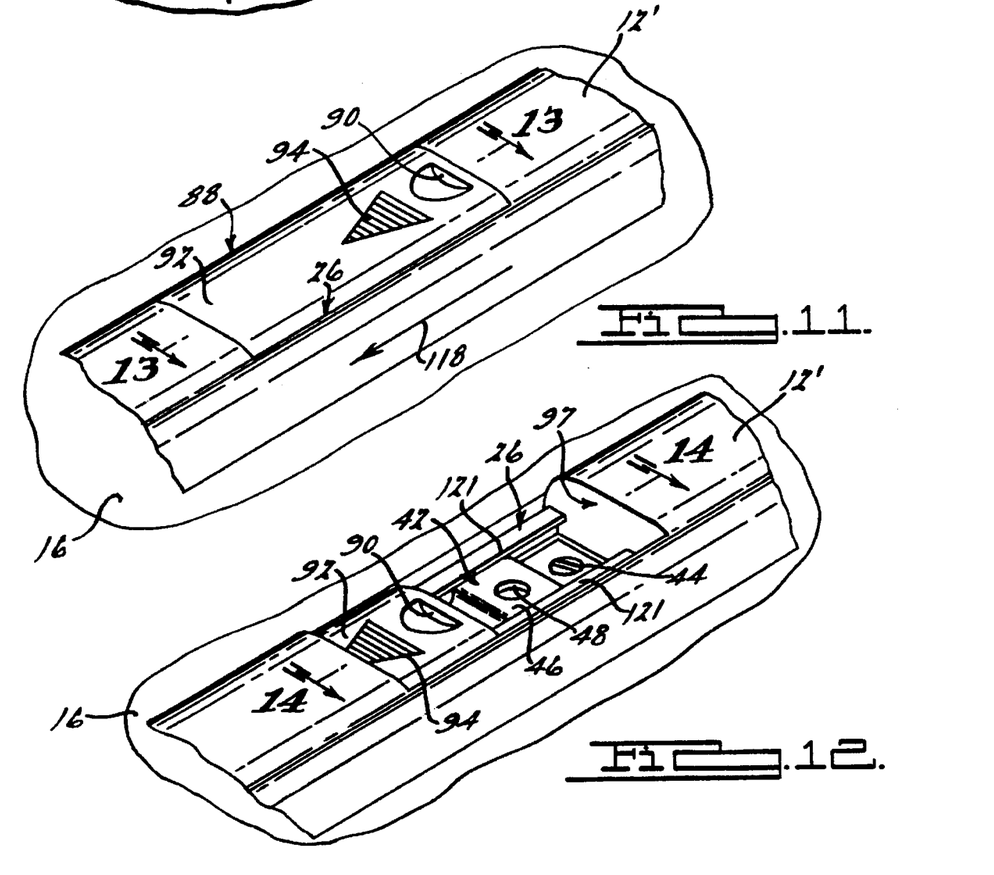
FIG. 11 is a perspective view of a fifth alternative preferred embodiment of the present invention showing the cover member in its extended position completely covering the mounting portion of the slat.
FIG. 12 is a view of the fifth alternative preferred embodiment shown in FIG. 11 wherein the cover member is shown in its retracted position, thus exposing the mounting portion and enabling a cross bar to be releasably attached to the slat.

Referring now to FIGS. 11 and 12, a cover member 88 in accordance with a fifth alternative preferred embodiment of the present invention is shown. The cover member 88 is slidably moveable between an extended position, shown in FIG. 11, wherein the cover member 88 completely closes the mounting portion 26 of a slat 12', and a retracted position shown in FIG. 12. In the retracted position, the cover member 88 is partially housed within an interior area of the slat 12' to expose the mounting portion 26 of the slat 12'. To help facilitate sliding movement of the cover member 88, a recess 90 is formed in an outer surface 92 of the cover member 88. An optional plurality of ridges 94 may also be provided in the outer surface 92 to help grip the outer surface 92 when slidably retracting the cover member 88 into its retracted position shown in FIG. 12. Alternatively, a second recessed portion could be provided in lieu of the ridges 94 and positioned 180° opposite to the recess 90 to enable the cover member 88 to be engaged with a finger.

Figure 13:
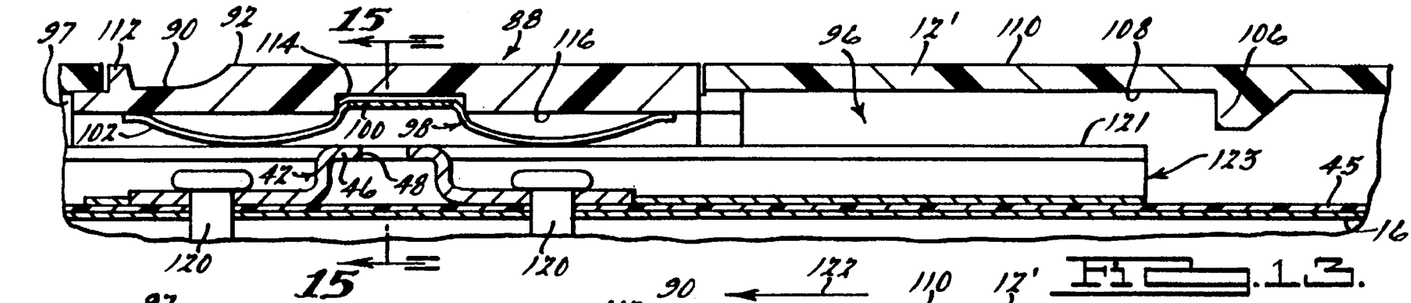
FIG. 13 is a partial cross-sectional view of the fifth alternative preferred embodiment shown in FIG. 11 taken in accordance with section line 13—13 in FIG. 11, illustrating the cover member in its extended position.
Figures 14, 15, 16:
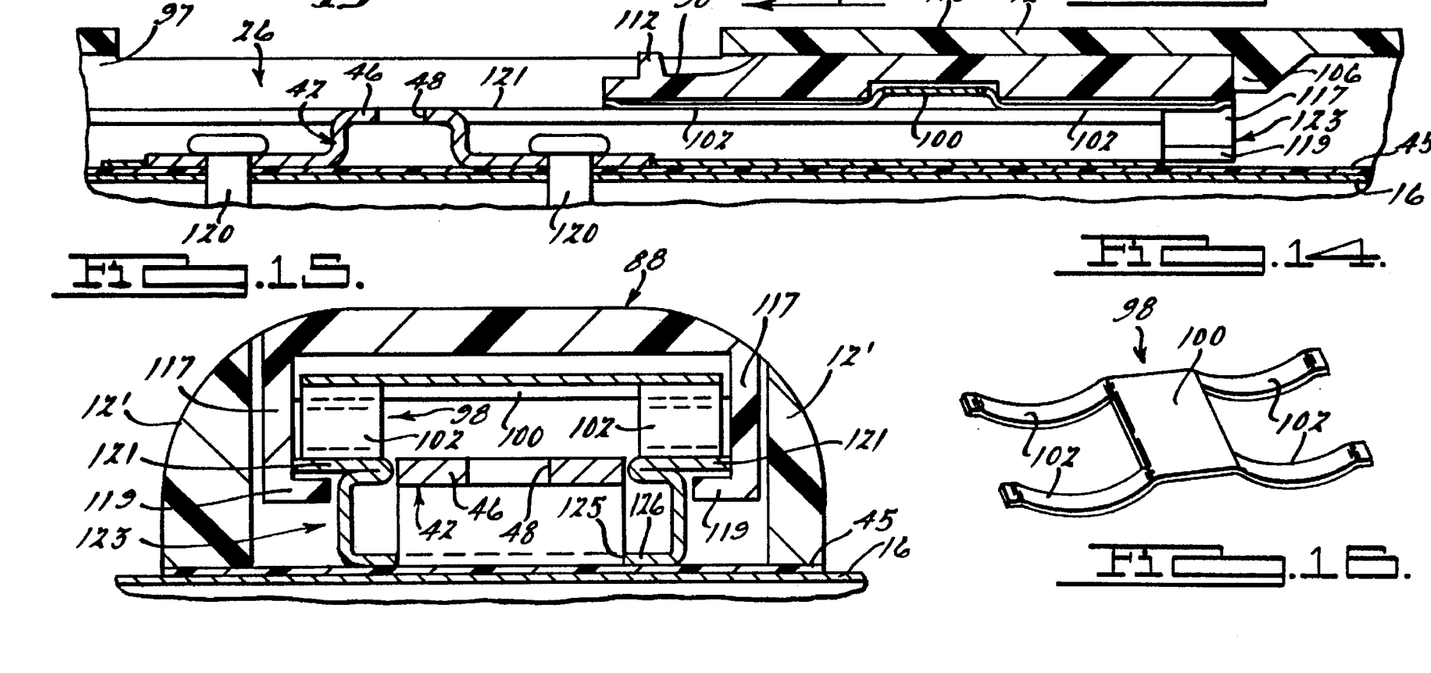
FIG. 14 is a partial cross-sectional view of the fifth alternative preferred embodiment shown in FIG. 12 taken in accordance with section line 14—14 in FIG. 12, showing the cover member in its retracted position.
FIG. 15 is a cross-sectional end view of the embodiment of FIG. 13 taken in accordance with section line 15—15 in FIG. 13.
FIG. 16 is an enlarged perspective view of the H-shaped clip used in the fifth alternative preferred embodiment of FIGS. 11–15.

With reference to FIGS. 13–15, the interior structure of the slat 12' can be seen. With specific reference to FIG. 13, the slat 12' includes a first hollow portion 96 positioned adjacent the mounting portion 26 on one side, and a second hollow portion 97 on the opposite side of the mounting portion 26. The cover member 88 includes a clip 98, preferably made from steel and having some resiliency, having a central portion 100 and a pair of semi-circular arm portions 102. As shown in FIG. 16, the clip 98 is generally in the shape of an "H" with the exception that the arm portions 102 are curved.

With further reference to FIGS. 13 and 14, a stop portion 106 projects from an inner surface 108 of an upper wall 110 of the slat 12'. As can also be seen in FIG. 13, the cover member 88 includes a stop portion 112 adapted to limit sliding movement of the cover member 88 in the extending direction. The clip 98 may be secured by a threaded fastener or by press-fitting it into a recessed portion 114 of an undersurface 116 to the cover member 88.

With specific reference to FIG. 15, the cover member 88 can be seen to include a pair of sidewall portions 117 having lower ledge portions 119 facing inwardly towards each other. The lower ledge portions 119 extend underneath outwardly protruding arm portions 121 of an elongated channel member 123, also visible in FIGS. 13 and 14. The elongated channel member 123 includes a suitably shaped central opening 125 within which the securing member 42 is positioned. The securing member 42 is secured to the vehicle body surface 16 by rivets 120 in this embodiment and need not be incorporated to effect proper operation of the cover member 88. If incorporated, however, a protrusion could be formed on the central portion 100 of the clip 98, which engages with the opening 48 of the securing member 42 to even more positively hold the cover member in its extended (i.e., closed) position. The elongated channel 123 may be secured to the vehicle body surface 16 in any conventional fashion such as by threaded fasteners through a base portion 126 thereof. The arm portions 121 serve to captively retain the cover member 88 within the mounting portion 26 of the slat 12' such that the cover member 88 cannot be inadvertently removed from the slat 12'. From FIGS. 13 and 15, it can also be seen how the cover member 88 forms the appearance of an integrally formed portion of the slat 12', when the cover member 88 is in the extended (i.e., closed) position.

Referring now to FIG. 14, when the cover member 88 is to be retracted to allow the cross bar 20 (FIG. 1) to be secured to the slat 12', the cover member is urged slidably in the retracted direction by placing at least one finger on the plurality of ridges 94 and/or within the recess 90 and pushing inwardly on the outer surface 92 towards the outer body surface 16 of the vehicle 18, while slidably urging the cover member 88 in the direction of arrow 118 in FIG. 11. The cover member 88 has to be pushed down sufficiently such that the outer surface 92 clears the under surface 108 of the hollow portion 96 such that the cover member can be then slid into the hollow portion 96. The cover member 88 is urged slidably into the hollow portion 96 until it makes abutting contact with the stop portion 106. In this position, the cover member 88 will be held stationary by the spring force created by the compression of the arm portions 102 of the clip 98 when the arm portions 102 are flattened against the arm portions 121 of the channel member 123. The cross bar 20 (FIG. 1) can then be installed in the mounting portion 26.

With further reference to FIGS. 13 and 14, when the cover member 88 is to be urged into its extended position wherein the mounting portion 26 will be completely closed-off by the cover member, one or more fingers may be placed in the recess 90 and the cover member 88 urged slidably in its extended direction in accordance with directional arrow 122 in FIG. 14. As the cover member 88 is urged out of the hollow portion 96, the spring force provided by the semi-circular arm portions 102 of the clip 98 operate to urge the cover member 88 outwardly such that the outer surface 92 is disposed flush with the upper wall 110 of the slat 12 when the cover member 88 is in its fully extended position. In this position, as shown in FIG. 13, the stop portion 112 abuts a portion of the slat 12 to limit extending sliding movement of the cover member 88. In this position, a small portion of the cover member 88 protrudes into the second hollow portion 97. The cover member 88 and slat 12' of the fifth alternative preferred embodiment provide the advantage that the cover member 88 cannot be lost or misplaced by the operator of the vehicle 18, since the cover member 88 cannot be physically removed from the slat 12'.

The slats 12, 12' and 14 of the present invention are preferably extruded or injection molded from a suitably strong plastic such as PVC. The cover member of each preferred embodiment described herein is also preferably formed either through conventional injection molding techniques from a suitably high-strength plastic. The various preferred embodiments described herein all provide the advantage of enabling the mounting portion of a slat to be quickly and easily covered when the slat is not in use to provide a more aesthetically pleasing appearance to the slat, and a more aerodynamic surface portion for the slat. Furthermore, the cover members of the preferred embodiments described herein each enable the mounting portions to be quickly and easily covered and uncovered without the need for special tools or detailed assembly and/or disassembly procedures which could otherwise be time consuming and cumbersome to perform each time the cross bar is removed from or attached to the slats 12, 12' and 14.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier comprising:

a pair of slats fixedly secured to an outer body surface of a vehicle;

at least one cross bar extending between said slats and adapted to support cargo above said outer body surface of said vehicle;

each one of said slats having a recess including a mounting portion adapted to releasably engage with said cross bar such that said cross bar is maintained securely at a specific location along said slats; and a cover for covering said mounting portion of each said slat when said cross bar is removed from said slats and said vehicle article carrier is not in use;

said cover being sized so as to fit substantially entirely within said recess, and said cover having an outer contour shaped to match an outer cross-sectional contour of its associated said slat to provide the appearance of an integrally formed portion of said associated slat.

2. The vehicle article carrier of claim 1, wherein said cover comprises:

a clip for releasably affixing to said mounting portion.

3. The vehicle article carrier of claim 2, wherein said slat comprises a metallic securing bracket fixedly secured thereto;

wherein said cover comprises at least one magnet; and said magnet cooperating with said metallic securing bracket to further help maintain said cover releasably engaged with said slat when said cover is secured to said mounting portion of said slat.

4. The vehicle article carrier of claim 1, wherein said cover includes a slot and a clip disposed within said slot; and wherein said slat includes a securing bracket adapted to releasably receive a portion of said clip when said cover is positioned to cover said mounting portion of said slat.

5. The vehicle article carrier of claim 1, wherein said cover includes:

at least one groove; and wherein said slat includes a securing bracket having a ledge portion adapted to slidably engage within said groove when said cover is slidably inserted into said mounting portion of said slat to thereby retain said cover to said slat.

6. The vehicle article carrier of claim 5, wherein said cover includes at least one recess for supporting a magnet therein.

7. The vehicle article carrier of claim 1, wherein said cover includes at least one magnet fixedly secured thereto;

wherein said slat includes a metallic securing bracket positioned within said mounting portion; and wherein said magnet cooperates with said metallic securing bracket to assist in releasably securing said cover to said mounting portion of said slat.

8. The vehicle article carrier of claim 1, wherein said slat includes a hollow portion adjacent said securing portion; and wherein said cover is slidable between a retracted position, wherein said cover is partially disposed within said hollow portion, and an extended position wherein said cover completely covers said securing portion.

9. A vehicle article carrier comprising:

a pair of elongated slats fixedly secured in spaced apart relation from one another on an outer body surface of a vehicle;

each of said slats having at least one recess forming a securing portion at an area at which a cross bar is attachable to each said slat;

a cross bar securable to said slats at said securing portions of said slats;

a cover member for covering said securing portion of a respective one of said slats;

said cover member being sized so as to fit substantially entirely within said securing portion, and said cover member having an outer contour shaped to match an outer cross-sectional contour of its said respective one of said slats; and said cover member comprising a securing implement for securing said cover member in place over said mounting portion such that said cover member provides the appearance of an integral portion of said respective one of said slats.

10. The vehicle article carrier of claim 9, wherein said securing implement comprises a clip secured to said cover member and adapted to releasably engage within said mounting portion when said cover member is positioned in said mounting portion of said respective slat.

11. The vehicle article carrier of claim 9, wherein said securing implement comprises a clip secured to said cover member which releasably engages within said mounting portion of said respective slat when said cover member is positioned within said mounting portion; and wherein said cover member includes at least one magnet; and wherein said respective slat includes a metallic securing bracket affixed within said mounting portion, which, in cooperation with said magnet, assists in securing said cover member releasably within said mounting portion.

12. The vehicle article carrier of claim 9, wherein said mounting portion of said respective slat includes a securing bracket positioned therein, said securing bracket including at least one ledge portion; and wherein said cover member includes at least one groove formed therein adapted to receive said ledge portion when said cover member is positioned within said mounting portion.

13. The vehicle article carrier of claim 9, wherein said securing implement includes a tang portion;

wherein said mounting portion includes a securing member having an opening adapted to at least partially receive said tang portion when said cover member is positioned within said mounting portion such that said cover member is releasably secured to said mounting portion; and wherein said cover member provides the appearance of an integrally formed portion of said respective slat when secured in place in said mounting portion of said respective slat.

14. The vehicle article carrier of claim 9, wherein said respective slat includes a hollow portion adjacent said mounting portion;

wherein said respective slat includes a securing member positioned within said mounting portion;

wherein said cover member is slidably disposed on said respective slat such that a major portion of said cover member may be slidably urged into said hollow portion to retract said cover member to thereby expose said mounting portion when said cross bar is to be secured to said mounting portion;

wherein said cover member is slidable into an extended position to completely cover said mounting portion;

wherein said securing implement releasably engages said securing member when said cover member is positioned to cover said mounting portion to releasably hold said cover member in said extended position covering said mounting portion; and when in said extended position, said cover member provides the appearance of an integrally formed portion of said respective slat.

15. A vehicle article carrier for supporting cargo above an outer body surface of a vehicle, said vehicle article carrier comprising:

at least one elongated slat having a recess forming a mounting portion and being adapted to be fixedly secured to said outer body surface of said vehicle;

at least one cross bar adapted to be releasably secured to said slat and adapted to support cargo thereon above said outer body vehicle surface;

said cross bar being securable to said slat at said mounting portion of said slat; and said mounting portion including a securing member positioned therein adapted to releasably engage with a portion of said cross bar when said cross bar is positioned on said mounting portion, a cover member sized to fit substantially entirely within said mounting portion and having an outer contour shaped to match an outer cross-sectional contour of said slat;

said securing member being further operable to releasably engage with said cover member when said cross bar is removed from said slat; and said cover member operating to cover said mounting portion when secured to said slat so as to provide the appearance of an integrally formed portion of said slat.

16. The vehicle article carrier of claim 15, wherein said cover member includes a clip secured thereto; and wherein said clip is adapted to releasably engage with said securing member when said cover member is positioned within said mounting portion of said slat.

17. The vehicle article carrier of claim 16, wherein said cover member includes a magnet;

wherein said securing member comprises a metallic securing bracket; and wherein said magnet and said metallic securing bracket cooperate to assist in maintaining said cover member secured to said slat when said cover member is positioned within said mounting portion of said slat.

18. The vehicle article carrier of claim 15, wherein said cover member includes at least one groove formed in a body portion thereof; and wherein said securing member includes at least one ledge portion adapted to slidably engage said groove when said cover member is inserted into said mounting portion of said slat to thereby assist in retaining said cover member within said mounting portion of said slat.

* * * * *

UNITED STATES PATENT AND TRADEMARK OFFICE
CERTIFICATE OF CORRECTION

PATENT NO. : 5,636,776

DATED : June 10, 1997

INVENTOR(S) : Artur K. Rak et al

It is certified that error appears in the above-indentified patent and that said Letters Patent is hereby corrected as shown below:

Item [76] on,
Title Page, Inventor "Arthur" should be --Artur--

Col. 1, line 16, "wide-variety" should be --wide variety--

Col. 1, line 39, "close-off" should be --close off--

Col. 1, line 55, "close-off" should be --close off--

Col. 4, line 33, "enerally" should be --generally--

Col. 4, lines 58-59, "portions 46" should be --portion 46--

Col. 7, line 57, "closed-off" should be --closed off--

Signed and Sealed this

Second Day of December, 1997

Attest:

BRUCE LEHMAN

*Attesting Officer*  *Commissioner of Patents and Trademarks*